M. J. MITCHEL.
MEAT TENDERER.
APPLICATION FILED FEB. 26, 1915.
1,170,772.
Patented Feb. 8, 1916.
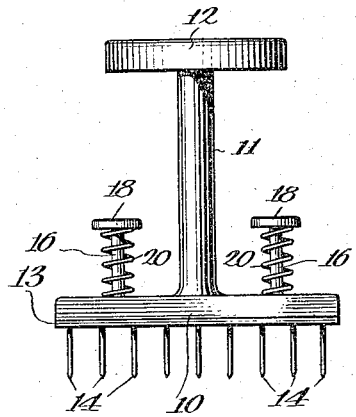
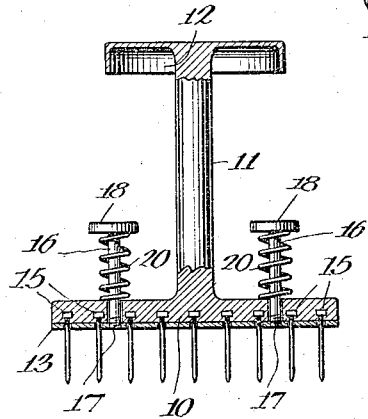
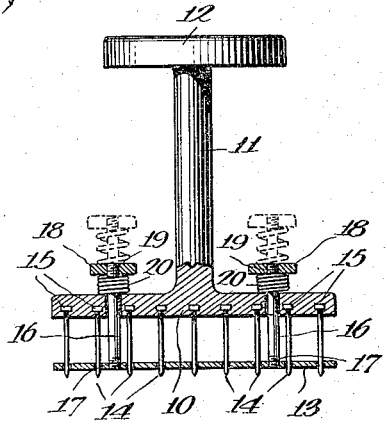
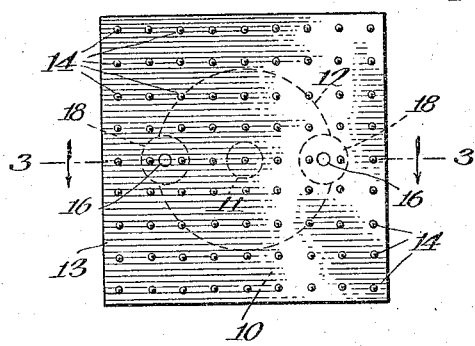
Witnesses:
Inventor:

UNITED STATES PATENT OFFICE.

MYRON J. MITCHEL, OF PHILADELPHIA, PENNSYLVANIA.

MEAT-TENDERER.

1,170,772.     Specification of Letters Patent.     Patented Feb. 8, 1916.

Application filed February 26, 1915. Serial No. 10,725.

*To all whom it may concern:*

Be it known that I, MYRON J. MITCHEL, a citizen of the United States, residing at Philadelphia, in the county of Philadelphia and State of Pennsylvania, have invented a new and useful Meat-Tenderer, of which the following is a specification.

My invention relates to a new and useful meat tenderer, in which a stripping plate is used to clean the tines of the device quickly and efficiently. Difficulty has been experienced in securing a tenderer in which particles may be easily and effectively removed from and between the tines, thus making the tenderer sanitary and odorless. I attain these objects by the device shown in the accompanying drawings in which—

Figure 1 shows a front elevation of my device; Fig. 2 shows a bottom view; Figs. 3 and 4 are sections taken on line 3—3 of Fig. 2, a movable stripper 13 being up in Fig. 3 and down in Fig. 4.

The same reference character refers to the same part throughout the several views.

The base plate of the main part is shown at 10 and has a stock 11 and a handle 12. The stripper 13 is below the base plate 10. This stripper is movable,—as will be hereinafter described. A plurality of tines or teeth 14 are set in sockets 15 in the base plate 10. The tines pierce the meat without tearing or flattening it and without releasing any of the juices of the meat. The base plate 10 has two apertures through which extend bolts or other securing members 16. Each bolt is screw-threaded on each end as shown at 17 and 19. These parts may, however, obviously, be made integral. The lower end of the bolt 16 is secured to the stripper by the screw-thread above referred to and the top end is secured to a finger head-piece 18. Around each bolt and between the head-piece 18 and the base plate 10 is placed a helical compression spring 20.

After meat has been tendered, it is found that small particles clog around the tines 14 and this detracts from the efficiency of the cleaning; in addition, if these particles are not removed and the tenderer cleaned thoroughly, it is apt to become unsanitary and have an odor, drawing flies and vermin. I remove this objectionable feature by thoroughly and quickly cleaning the tines after each tendering operation by the following means:—I press on the finger heads 18 and this pushes bolt 16 and thus the stripper 13 to which the bolt is secured. The stripper will pass down over the tines and take the position shown in Fig. 4. Upon releasing the finger from the finger heads 18, the compression spring 20 forces the stripping plate back to operative position. The simplicity of the device and the ease of operation of my invention are apparent.

Numerous changes in the details of construction may be made without departing from the spirit of my invention.

Having fully described my invention,— what I desire to secure by Letters Patent is:

A meat tenderer including a base plate provided with an operating member at substantially the axial center thereof and having two radially alined apertures, disposed at opposite sides of the axial center of the plate tines projecting from the plate in a direction opposite to the operating member, a stripping plate provided with apertures through which the tines of the base plate are freely directed, bolts detachably engaged with the stripping plate and freely directed through the apertures of the base plate, finger plates detachably engaged with the outer extremities of the bolts, and an expansible member surrounding each of the bolts and interposed between the base plate and the finger plate.

In testimony whereof, I hereby affix my signature in the presence of witnesses.

MYRON J. MITCHEL.

Witnesses:
HERBERT C. WHITAKER,
WILLIAM H. BALLS,
JAS. NELSON ALEXANDER.